June 4, 1968   H. L. MILLER   3,386,562
APPARATUS FOR INVERTING GRANULAR ARTICLES, SUCH AS COFFEE BEANS
Filed March 14, 1967   2 Sheets-Sheet 1

INVENTOR.
HARRY L. MILLER
BY

United States Patent Office 3,386,562
Patented June 4, 1968

3,386,562
APPARATUS FOR INVERTING GRANULAR
ARTICLES, SUCH AS COFFEE BEANS
Harry L. Miller, 647 Magnolia Ave.,
Larkspur, Calif. 94939
Filed Mar. 14, 1967, Ser. No. 623,039
7 Claims. (Cl. 198—33)

ABSTRACT OF THE DISCLOSURE

An apparatus for inverting granular articles such as coffee beans as it conducts them along a predetermined path while subjecting them to radiant heat. The apparatus comprises a rotating table plate whose upper surface is formed into a plurality of coaxially arranged annular terraces cascading downwardly from an elevated center area towards the periphery of the table. Stationary semicircular fenders are arranged along the edges of the terraces at angularly displaced sectors thereof, and stationary deflection means are provided intermediately of said fenders. The granular articles are fed onto the elevated center area. The deflection means extend into the path of the approaching articles on the rotating terraces and topple them onto a lower terrace where they land in inverted position.

---

The invention relates to apparatus of the type wherein granular articles are subjected to heat treatment by conducting them for a predetermined time underneath a source of radiant heat. Apparatus of this type are employed, for example, in the roasting of coffee beans, nuts or grain.

It is an object of the invention to provide an apparatus of this type which operates to invert the granular articles at predetermined intervals as it conducts them along a path of exposure to radiant heat so that all sides thereof are uniformly exposed to the heat treatment.

This and other objects of my invention will be apparent from the following description of the accompanying drawings which illustrate certain preferred embodiments thereof, and wherein.

Figure 1:
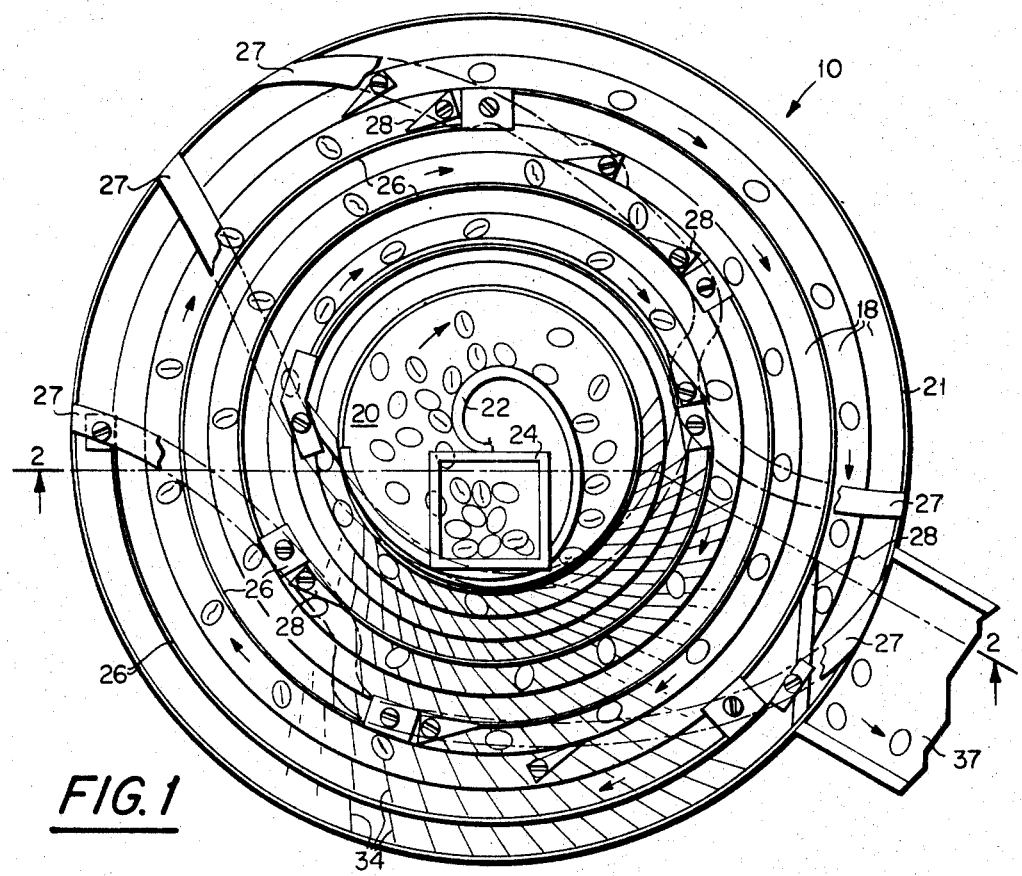
FIGURE 1 is a plan view of an article inverting apparatus embodying my invention.
Figure 2:
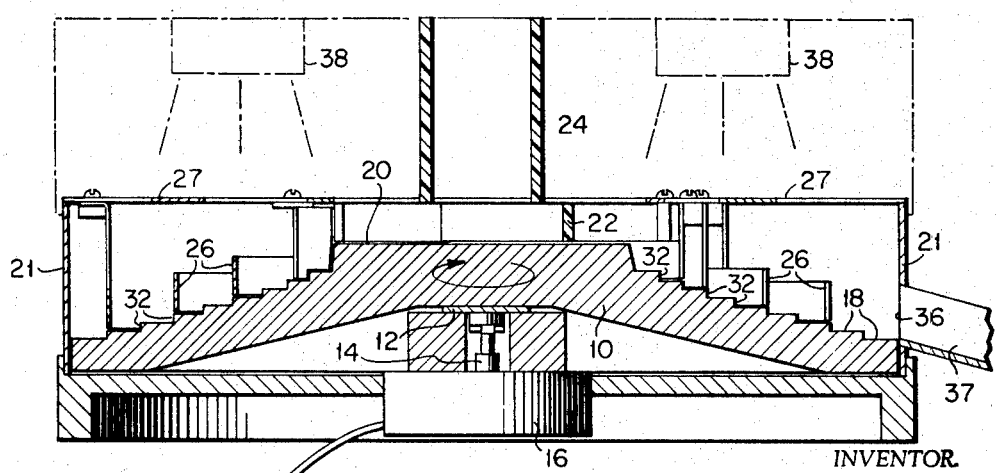
FIGURE 2 is a cross section taken along line 2—2 of FIGURE 1, and viewed in the direction of the arrows associated with said line.

The apparatus of the invention comprises a circular table plate 10 of metal or ceramic material mounted upon a base 12 which is suitably coupled to the output shaft 14 of an electric motor 16 (FIGURE 2). The upper surface of the table plate forms a plurality of concentrically arranged annular terraces 18 that cascade from a centrally located elevated circular platform 20 toward the periphery of the table plate around which is arranged a stationary annular wall 21. In the particular embodiment of the invention illustrated in the accompanying drawings the table forms nine such annular terraces of consecutively lower levels. Suitably supported a minute distance above the surface of the platform 20 is a stationary spiral-shaped guide fender 22 which recedes gradually from the center axis of the table toward the peripheral edge of the platform in the intended direction of rotation of the table, and mounted upon said stationary guide fender is a hopper 24. Said hopper is so located that it feeds granular material deposited thereinto onto the platform 20 into the space within the convolutions of the spiral guide fender. When the platform 20 is in rotation, it carries the granular articles out of the area within said fender and brings them ultimately against the outer surface of said fender, as illustrated in FIGURE 1. This is effective to push the grains gradually toward the periphery of the platform causing them to topple over onto the uppermost annular terrace 18 below.

Suitably supported above the table surface adjacent the outer edges of the terraces at angularly displaced sectors of the table surface are semicircular fenders 26. In the particular embodiment of the invention illustrated in the accompanying drawings these fenders are suspended from thin braces 27 (FIGURE 3) that rest upon and are secured to the upper edge of the circular wall 21 (FIGURE 2). Similarly supported adjacent the upstream or clockwise ends of said fenders (as viewed in the direction of travel of the granular material on the rotating terraces) are deflectors 28 in the form of vertically disposed blades that point in the direction from which the granular material upon the terraces approaches and which extend obliquely across said terraces, with their sharp edges 30 reaching into the proximity of the riser walls 32 of the next higher terraces. The number and exact location of the deflectors 28 and of the fenders 26 provided in the apparatus of the invention depends upon the number of times that it may be desired to invert the granular material on its travel from the hopper 24 to the lowest terrace adjacent the side wall 21 of the apparatus. For instance, only every second terrace may be provided with a fender 26, and the deflector adjacent its front end may be arranged to extend across two consecutive terraces, as illustrated for the two lowermost terraces in the right bottom quadrant of FIGURE 1.

Figure 3:
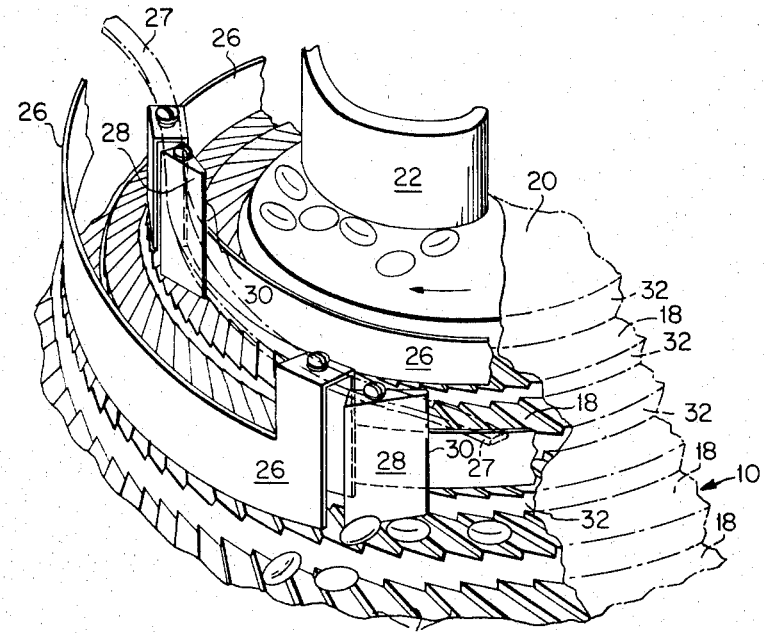
FIGURE 3 is a fragmentary perspective of part of the apparatus illustrated in FIGURES 1 and 2.

As best shown in FIGURE 3, the upper surfaces of the annular terraces 18 are formed into an endless sequence of transversely extending teeth 34 having steep leading edges and gradual trailing surfaces. These teeth provide friction which enables the rotating terrace surfaces to carry smooth-surfaced articles more positively against the deflection surfaces of the blades 28 so that the articles are effectively cammed over the edges of a terrace onto the next lower terrace below, rather than stagnate before the deflector with the rotating terraces passing ineffectively underneath. I have obtained best results when the ridges of the teeth are arranged to slant rearwardly from the inner peripheral circle of a terrace toward the outer peripheral edge thereof, and define consecutive tangents of an imaginary circle $i$ that is concentric with but of slightly smaller radius than the radius of said inner peripheral circle of the terrace, as geometrically illustrated in FIGURE 5. When the deflection surface of the blade 28 is simultaneously arranged to define an oppositely directed tangent to said same imaginary inner circle $i$, as likewise illustrated in FIGURE 5, the granular material on the rotating terrace is dependably pushed over the edge of the terrace, and comes to lie in inverted position upon the next lower terrace.

Figure 4:
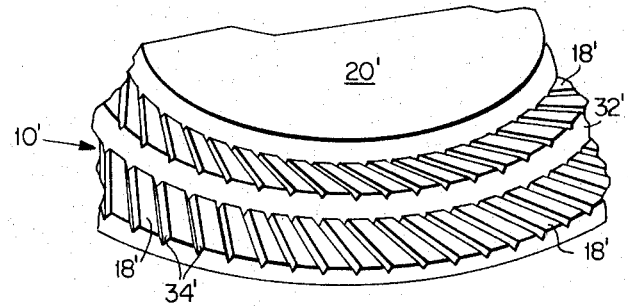
FIGURE 4 is a fragmentary perspective similar to FIGURE 3 illustrating a modified embodiment of the invention.
Figure 5:
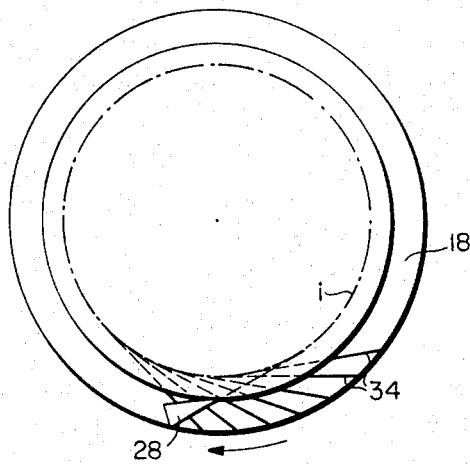
FIGURE 5 is a schematic plan view of one of the annular terraces of the apparatus of the invention illustrating the manner in which the deflection means are arranged relative to said terraces.

FIGURE 4 illustrates a modified embodiment of the invention wherein the upper surfaces of the terraces 18' are provided with grooves 34'. These grooves are so disposed that they define an endless sequence of tangents to an imaginary inner circle that is concentric with but of smaller radius than the inner peripheral circle of the terrace in the same manner as illustrated in FIGURE 5 for the teeth 30.

As previously pointed out, the rotary table 10 is surrounded by a stationary cylindrical enclosure 21 which has a discharge window 36 (FIGURE 2) adjacent the last of the deflectors 28. Through said window the granular articles are discharged into a chute 37. Located a distance above the described top surface of the rotary table 10 are electric radiators, such as infra red heating elements which are arranged to direct their heat radiations onto the table surface below and are schematically indicated at 38 in FIGURE 2.

In operation when the motor 16 turns the table 10 in clockwise direction, as indicated by the arrow in FIGURE 1 and the hopper 24 deposits granular articles, for instance, green coffee beans, onto the top platform 20 into the space surrounded by the convolution of the guide spiral 22, the rotation of the platform 20 carries the beans out of the interior of the spiral and brings them against the outer surface of said spiral, as illustrated in FIGURE 1. This is effective to push the beans toward the edge of the platform 20 from where they topple onto the first of the annular terraces 18 below. In doing so they will usually turn over for the first time so that the surfaces initially in contact with the surface of the platform, are now exposed to the radiant heat emitted by the elements 38. For dependability in effecting inversion of the beans when toppling them over the edge of the platform 20 or the outer edges of the annular terraces 18, it is advantageous to make the riser height of the side walls 32 of the platform and of the terraces somewhat higher than the average length of the granular article for which the apparatus is designed. For reason of compactness it is of advantage to make the tread width of the annular terraces 18 about equal to the average size of the articles for which the apparatus is designed; and since many granular materials expand and increase in size when subjected to a roasting process, it is of advantage to make the lower terraces of the apparatus of progressively increased tread width as illustrated in FIGURE 2. This avoids crowding of the articles which might shield some of the beans from the radiations of the elements 38.

When the beans that are carried along by the rotating terraces 18, come against one of the deflectors 28, they are swept towards the peripheral edges of the terraces and topple onto the terraces below. As previously pointed out, I have found it highly desirable to make the tread surfaces of the terraces uneven in the manner illustrated in FIGURES 3 and 4. If these surfaces were left smooth, the beans might accumulate before the deflectors, with the annular terraces moving ineffectively underneath the stationarized beans, instead of enabling the outwardly slanting surfaces of the deflectors 28 to cam them towards and over the edges of the terraces. I prefer to slant the teeth 34 or grooves 34 as described hereinbefore rather than dispose them radially, because I have observed that this increases the probability of the grains turning over completely as they are pushed over the outer edge of a terrace.

The semicircular fenders 22 are provided to confine the beans for about half of each full revolution of the rotary table to a particular set of annular terraces 18, and thus make sure that in traveling from the platform 20 to the exit window 36, they are exposed to the radiation of the heating elements 40 for a necessary minimum of time. Without these guards the action of the deflectors 28 might cause some of them to skip several terraces 18 and thus arrive at the exit window in insufficiently roasted condition.

The apparatus of my invention is compact. It does not only operate to expose granular material in a continuous process for a predetermined period of time to a source of heat radiations, it also operates dependably to turn the articles over periodically as they are exposed to the heat radiations thus making sure that both sides of the article are fully roasted, yet neither side is burnt.

While I have explained my invention with the aid of a particular embodiment thereof, it will be understood that the invention is not limited to the specific constructional details shown and described by way of example which may be departed from without departing from the spirit and scope of the invention.

I claim:

1. Apparatus for inverting granular material such as coffee beans, grain kernels and the like comprising a table having an upper surface arranged to form a plurality of concentrically arranged annular terraces cascading from the center of the table toward the peripheral edge thereof, stationary means extending across said terraces for deflecting granular material deposited onto said terraces toward the peripheral edges thereof, and means for turning said table.

2. Apparatus according to claim 1 including linear irregularities provided across the tread surfaces of said terraces.

3. Apparatus according to claim 1 including linear irregularities provided across the tread surfaces of said annular terraces in such a manner that they define an endless sequence of tangents to a circle concentric with but of lesser radius than the inner peripheral circle of the terrace.

4. Apparatus according to claim 1 including semicircular fenders arranged adjacent the outer periperal edges of selected ones of said terraces along angularly displaced sectors of said table surface.

5. Apparatus according to claim 1 including stationary semicircular fenders provided adjacent the outer edges of selected ones of said terraces along angularly displaced sectors of said table surface, with said deflectors provided adjacent the upstream ends of said fenders and extending across the terraces which said fenders confine.

6. Apparatus according to claim 1 wherein the successively lower ones of said terraces are of progressively wider width.

7. Apparatus according to claim 1 including linear irregularities provided across the tread surface of said annular terraces in such a disposition that they define a sequence of tangents to an imaginary circle concentric with but of lesser radius than the inner peripheral circle of the terrace; and wherein the deflection surfaces of said deflection means are disposed to define oppositely directed tangents to said imaginary circle.

References Cited

UNITED STATES PATENTS 3,272,310   9/1966   Blickisdorf _____ 198—33

EDWARD A. SROKA, *Primary Examiner.*